United States Patent Office 3,431,734
Patented Mar. 11, 1969

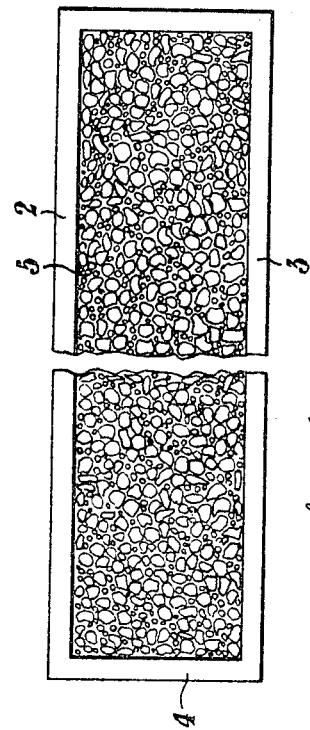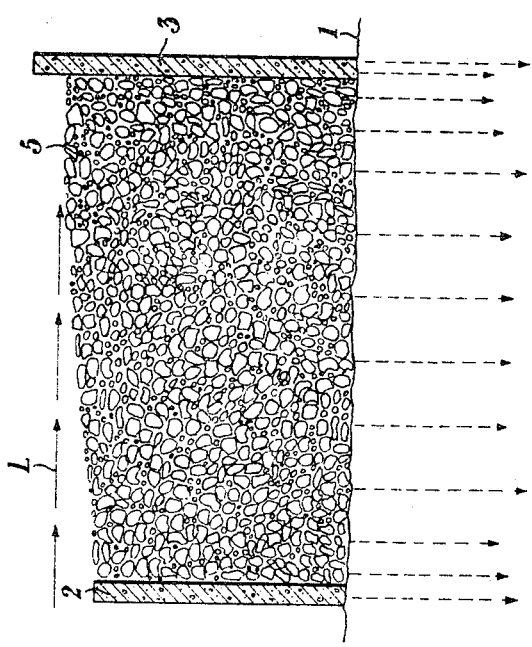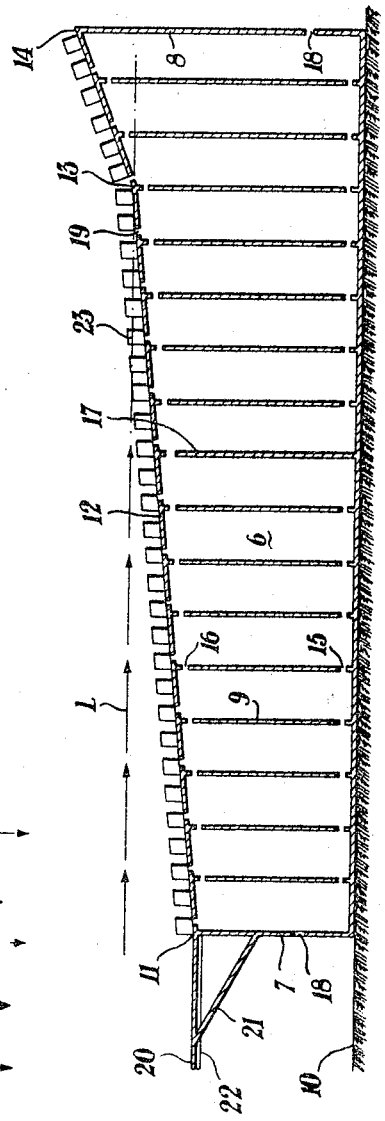

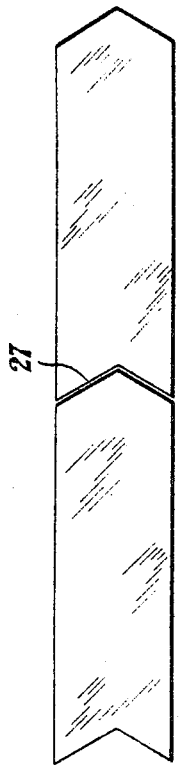
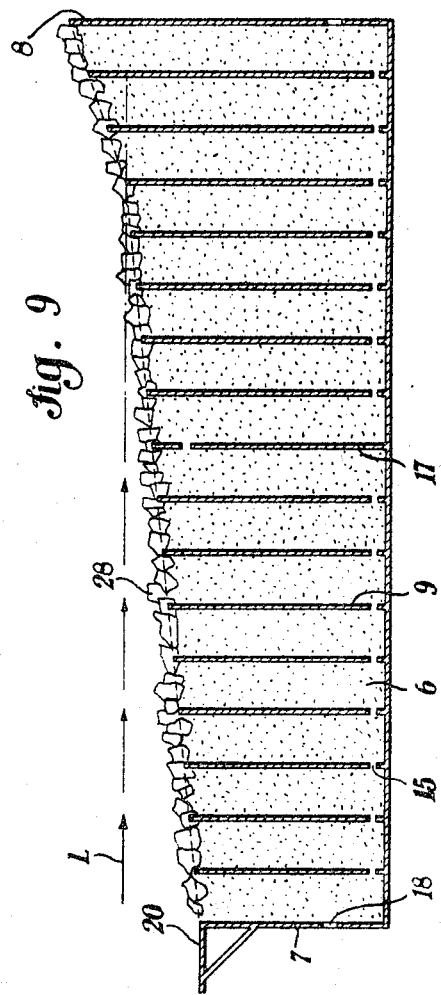

3,431,734
TOTALLY OR PARTIALLY PREFABRICATED STRUCTURE BAR-DAM FOR THE PROTECTION OF HARBORS
Giuseppe Vattuone, 11 Via Rovereto, Rome, Italy
Filed Aug. 22, 1966, Ser. No. 573,927
Claims priority, application Italy, June 13, 1966, 13,465/66
U.S. Cl. 61—4        9 Claims
Int. Cl. E02b 3/04

ABSTRACT OF THE DISCLOSURE

A harbor protecting bar-dam comprising a cellular structure adapted for resting on the sea bottom, and provided with an upper wave resolution surface carrying a plurality of spaced resistance elements. The wave resolution surface is inclined so as to extend upwards from an immersed point located at the outer end to a point above the level of the sea at its inner end.

---

The present invention relates to a totally or partially prefabricated structure bar-dam for the protection of harbors.

Up to now, the various kinds of "cast," "vertical," "mixed type" dams, piers and breakwaters, in their various technical embodiments, for the protection of harbors, oppose directly the waves in order to annul their force.

Therefore, the force of the waves, which attains recorded pressures up to 70 tons per square metre, and an impact speed about 250 km. per hour, breaks, separates, dislodges, removes, sweeps away the rocks of the dams and the like, rendering necessary continuous checking, maintaining and rebuilding operations, so that, absolutely speaking, no artificial harbor is safe, as no dam is safe, and also the maintenance and repair costs initiate the same day when the dam has been built.

Also, the embodiment of dams is limited to the shallows.

The purpose of this invention is that of annulling the wave force before the wave reaches, with its impact force, the contact with the dam.

The wave force will be annulled only by resoluting the wave on a shallow, as it occurs on any shore or bar or sandbank.

According to this invention, this purpose is obtained by a dam embodying a shallow useful for resoluting the wave forming a bar (and not a barrage) i.e., an underwater, toothed, fixed slope plane, which, at its outer side will reach a depth equalling one half of the height of the maximum wave for each sea, while at its inner side said plane will reach the zero level and more, affording as many resoluting points as there waves and determining a guided reflux stream and the associated compensating streams.

Thus, the wave will be intercepted in the high sea before attaining speed, and is compelled to break on the water, while the dam will be protected by the sea, remaining thus invulnerable.

The dam can be assembled either partially or totally on land, by means of cellular caisson elements made of reinforced concrete and iron elements to be sunk in place, after a study of the sea bottom, with little if any work in sea, enormously reducing both the assembly time and the cost, and obtaining the immediate operation and possibility of recovery.

This dam, also, can be embodied in depths attaining hundreds of metres.

This invention will be now described with reference to the attached drawing showing only by way of non limitative example certain preferred embodiments of the invention itself.

In the drawings:

FIGURE 1 diagrammatically shows in top plan view, a caisson bar dam according to this invention;

FIGURE 2 is a transversed sectional view of the dam of FIGURE 1, on an enlarged scale;

FIGURE 3 shows a cross sectional view of a cellular prefabricated damp;

FIGURES 7 and 8 show an embodiment suitable for great depths, diagrammatically in perspective and in top plan view, respectively; and FIGURE 9 shows a partially prefabricated embodiment, suitable for reduced depths, in cross sectional view.

Figure 4:
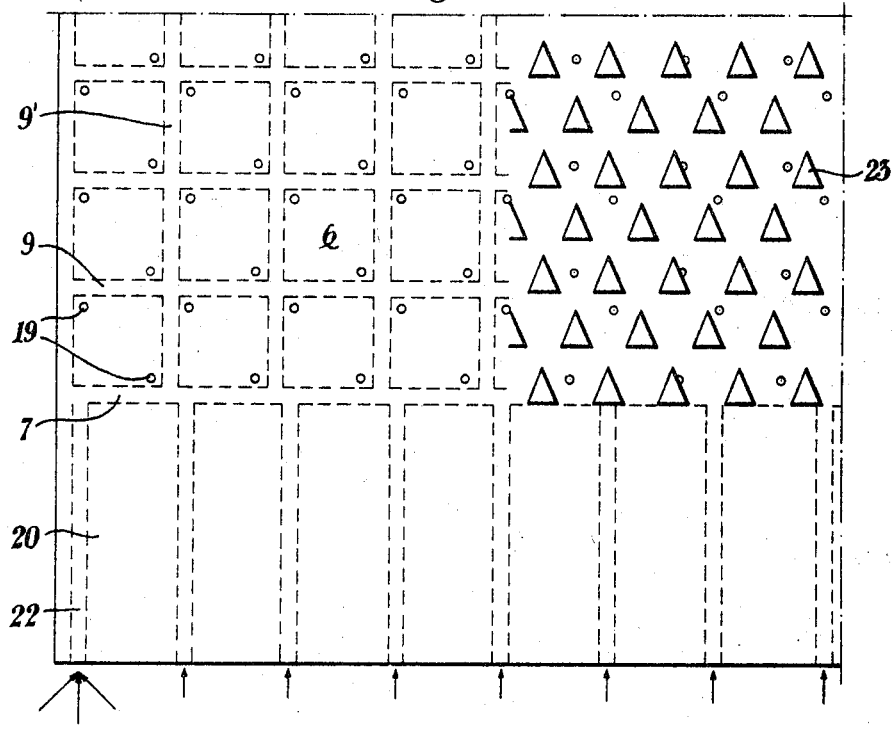
FIGURE 4 is a partial top plan view, corresponding to FIGURE 3.

With reference to FIGURES 1 and 2, the invention provides for a hollow structure, resting on the sea bottom 1, and including an outer wall 2, an inner wall 3 parallel to the outer wall, and two heads 4.

As shown in FIGURE 2, the outer wall 2 is somewhat below the liquid level L, while the inner wall is slightly above said level.

Inside the above described structure, a filling 5 made of either natural or artificial rocks is located, with their upper surface inclined, as shown in FIGURE 2. Thus a resoluting artificial bottom will be created, acting on the wave in the above disclosed way.

In FIGURES 3 and 4, a bar-dam according to this invention of the prefabricated cellular structure type has been shown. It consists of a set of cells 6 bounded by the outer wall 7, by the inner wall 8, by the partition walls 9 parallel to each other and by the cross walls 9'.

The outer wall 7 extends upwardly from the sea bottom 10 to an immersed point 11 which is located, with respect to the liquid level L, at a depth equalling about one half of the maximum wave occurring at that location.

The structure is covered by a continuous slab 12, upwards inclined from the point 11 in the direction of the wave movement with a slope about 10% up to the point 13 which is located at zero level, continuing therefrom with a slope about double that of the preceding portion, up to the top 14 of the inner wall 8, said top emerging from the liquid level by an amount equalling about one half of the height of the maximum wave.

The partition walls 9 are provided at their bases and at their tops with passages 15 and 16 which cause the adjacent cells to communicate, while the central partition wall 17 forms a water tight bulkhead at the base dividing the cellular structure and allowing by partial flooding of the cells, the attitude of navigating and lying of the cells on the sea bottom, as it will be better described later on.

The outer wall 7 and the inner wall 8 are provided with flooding valves 18 which can be remotely operated, while the slab 12 is provided, for each cell, with a pair of apertures 19 which can be closed by a screw plug. The apertures 19 serve the purpose of allowing each cell 6 to be flooded or emptied, as well as subdividing the hydraulic pressure due to the resolution of the waves, in the various cells.

From the outer edge of the inclined slab 12 and aligned therewith, a horizontal member 20 projects, supported, if necessary, by the brackets 21, and serving the purpose of effecting a preresolution of the wave.

Said projecting member 20 is provided with a set of horizontal ducts 22 communicating with the cells adjacent to the outer wall.

The surface of the inclined slab 12 (resolution surface) is provided with a plurality of triangular pillars 23 arranged on diagonally staggered lines, with their bases facing outwards, and the apex pointing in the direction of movement of the wave. Thus, the wave through its active run meets the maximum resistance, due to the front surfaces of the pillars 23, while the reflux wave will find a little resistance as it hits the corners of said pillars.

The described structure will be assembled on land, and then launched, dragged to the preestablished point and then sunk in position, by means of the already described flooding valves. The reinforced concrete structures or metal structures forming the bar-dam as hereinbefore described have exclusively the function of containing the water and do not serve the purpose of resisting to the wave which will be resoluted and annulled in a gradual and progressive way by the resoluting surfaces. Of course the dimensions of the surface which can be repeated by blocks, until reaching the extension and the development as desired, will be made in relationship with the planning data.

Figure 5:
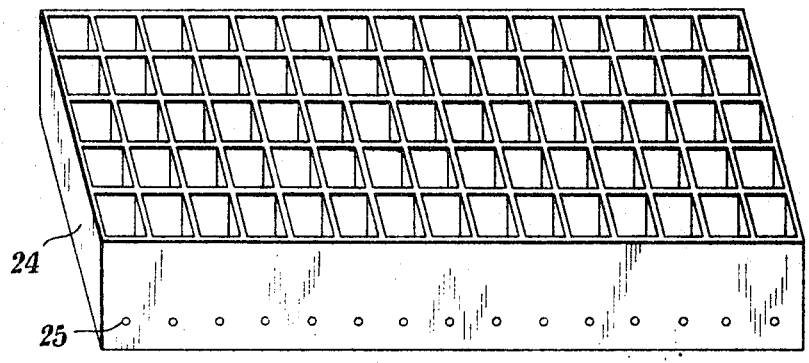
FIGURE 5 shows an axonometric view of a cellular base element.
Figure 6:
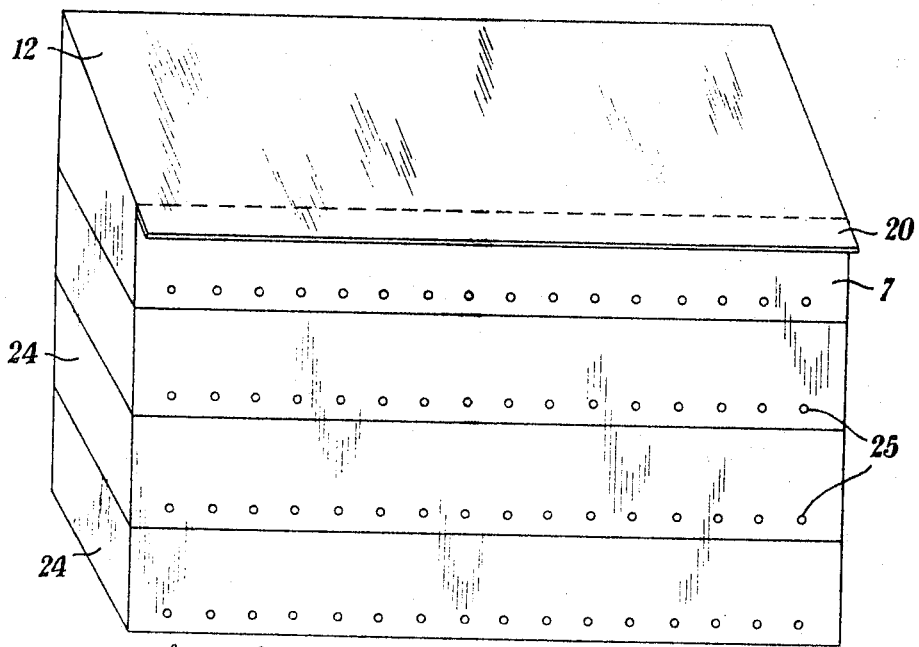
FIGURE 6 shows the dam resting on a set of superposed base elements.

In case of great depth, the cellular structure as hereinbefore described, instead of resting directly on the bottom of the sea, can be located on one or more foundation elements 24, superposed on one another (FIGURES 5 and 6).

Figure 7:
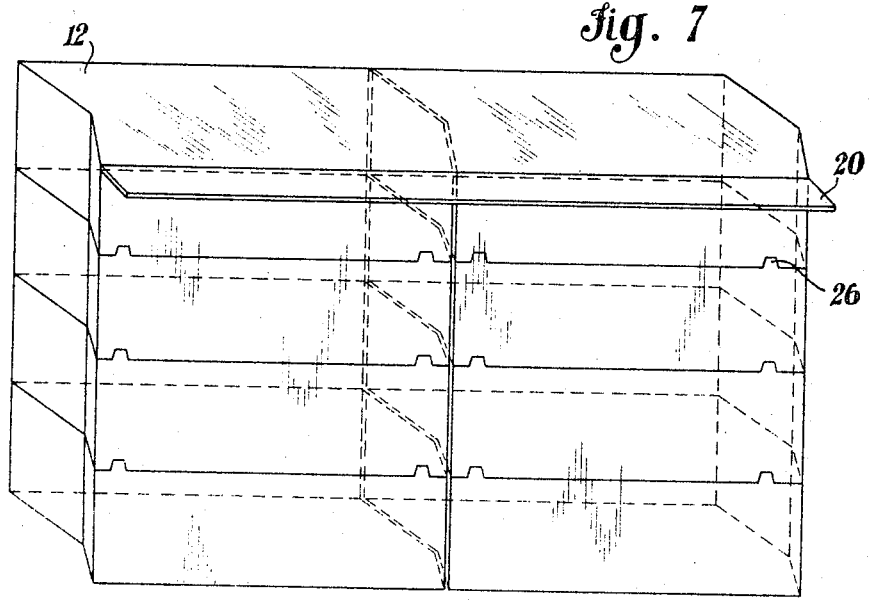

Said elements are also constructed with a cellular structure, and provided with flooding valves 25. For very deep bottoms, it will be possible to adopt the elements as diagrammatically shown in FIGURES 7 and 8, longitudinally interlocked by means of the connection members 26 and cross wise by the dihedron-shaped heads 27. For assembly, launching and sinking said foundation elements, the same techniques as already disclosed with respect to the bar-dam, are valid.

FIGURE 9 shows a different embodiment, partially prefabricated, and suitable for ordinary depths. In this case, the cellular structure is open at its top and the cells 6 are filled with sand pumped in loco; the inclined resolution surface is embodied by a layer 28 made of natural or artificial rocks.

I claim:
1. A harbor protecting bar-dam comprising a partially submerged cellular structure supported by the sea bottom, and provided with an upper generally continuous wave resolution surface, and a plurality of spaced resistance elements projecting upwardly of said wave resolution surface in spaced relation, said structure having in one direction spaced inner and outer ends, said surface being inclined in said one direction so as to extend continuously upwards from an immersed point located at said outer end to a point above the level of the sea at said inner end and said elements being closely disposed from said outer end to said inner end for substantially the entire width of said surface transversely of said direction.

2. A dam as claimed in claim 1, wherein said resolution surface has a difference of level between said ends corresponding to at least one half of the height of the maximum wave.

3. A dam as claimed in claim 1, wherein said resolution surface has two portions of different slope, the first of which extends from the outer end to water level, while the second has an inclination greater than that of the first and extends from the waterlevel to the inner end.

4. A dam as claimed in claim 1, wherein said resistance elements each consist of a vertical trangular projection with its apex facing in the direction of the wave movement, the projections being arranged on diagonal spaced lines.

5. A dam as claimed in claim 1 comprising at least one base element on which said cellular structure rests, said base element comprising a parallelepiped body having a cellular structure and including flooding means.

6. A dam as claimed in claim 1, wherein said cellular structure is open at its top and the cells are filled with sand, the elements of the inclined resolution surface being provided by a layer of rocks located on the sand.

7. A dam as claimed in claim 1, wherein said cellular structure includes partitions defining a plurality of rectangular recesses, communicating with one another by compensation passages, located at the top of the partitions, and flooding apertures located at the base of said partitions.

8. A dam as claimed in claim 7 comprising flooding valves at said ends of the structure, said resolution surfaces being in communication with the underlying recesses via watertight closable passages in said surface.

9. A dam as claimed in claim 7, wherein said structure comprises a horizontal projecting member at said outer end provided with a plurality of ducts communicating with the first line of recesses.

References Cited

UNITED STATES PATENTS

| | | | |
|---|---|---|---|
| 473,205 | 4/1892 | Boeckh | 61—3 |
| 618,319 | 1/1899 | Averill. | |
| 1,255,702 | 2/1918 | Brown | 61—46 |
| 1,423,884 | 7/1922 | Rush | 61—46 |
| 1,812,300 | 6/1931 | Leeds et al. | 61—46 |
| 2,014,116 | 9/1935 | Powers | 61—4 |
| 2,539,850 | 1/1951 | Marry | 61—4 X |
| 2,755,631 | 7/1956 | Hayden | 61—4 |
| 2,920,454 | 1/1960 | Wolf | 61—4 |
| 3,096,621 | 7/1963 | Danel | 61—4 |
| 3,335,572 | 8/1967 | Tsujioka | 61—46 X |

FOREIGN PATENTS

| | | |
|---|---|---|
| 567,728 | 11/1958 | Belgium. |
| 676,082 | 7/1952 | Great Britain. |
| 877,057 | 9/1961 | Great Britain. |
| 616,363 | 2/1961 | Italy. |

EARL J. WITMER, *Primary Examiner.*